(12) United States Patent
Horlander et al.

(10) Patent No.: US 7,359,376 B1
(45) Date of Patent: Apr. 15, 2008

(54) SERIAL COMPRESSED BUS INTERFACE HAVING A REDUCED PIN COUNT

(75) Inventors: Thomas Edward Horlander, Indianapolis, IN (US); Eric Stephen Carlsgaard, Indianapolis, IN (US)

(73) Assignee: Thomson Licensing, Boulogne-Billancourt (FR)

( * ) Notice: Subject to any disclaimer, the term of this patent is extended or adjusted under 35 U.S.C. 154(b) by 903 days.

(21) Appl. No.: 09/716,721

(22) Filed: Nov. 20, 2000

(51) Int. Cl.
*H04L 12/50* (2006.01)

(52) U.S. Cl. .................. 370/366; 370/536; 370/542
(58) Field of Classification Search ............. 370/366, 370/532–543, 544; 341/100; 327/415; 712/8
See application file for complete search history.

(56) References Cited

U.S. PATENT DOCUMENTS

| | | | | |
|---|---|---|---|---|
| 4,413,338 A | * | 11/1983 | Renoulin et al. | 370/458 |
| 4,656,620 A | | 4/1987 | Cox | 370/58 |
| 4,700,341 A | * | 10/1987 | Huang | 370/471 |
| 5,621,901 A | | 4/1997 | Morriss et al. | 395/306 |
| 5,887,039 A | * | 3/1999 | Suemura et al. | 375/365 |
| 5,926,120 A | * | 7/1999 | Swenson et al. | 341/100 |
| 5,940,402 A | | 8/1999 | Krakovyak | |
| 6,094,696 A | * | 7/2000 | Choe et al. | 710/57 |
| 6,108,726 A | | 8/2000 | Runaldue et al. | |
| 6,151,334 A | * | 11/2000 | Kim et al. | 370/468 |
| 6,269,435 B1 | * | 7/2001 | Dally et al. | 712/8 |
| 6,611,538 B1 | * | 8/2003 | Malerevich et al. | 370/503 |
| 6,636,483 B1 | * | 10/2003 | Pannell | 370/236 |
| 2002/0024610 A1 | * | 2/2002 | Zaun et al. | 348/366 |

FOREIGN PATENT DOCUMENTS

| | | |
|---|---|---|
| EP | 0522764 A2 | 1/1993 |
| JP | 10-173723 | 6/1998 |
| JP | 11-514815 | 12/1999 |
| WO | WO 00/38045 | 6/2000 |

OTHER PUBLICATIONS

International Search Report of Dec. 17, 2002.

* cited by examiner

*Primary Examiner*—Edan Orgad
*Assistant Examiner*—Chuong Ho
(74) *Attorney, Agent, or Firm*—Joseph J. Laks; Robert D. Shedd; Reitseng Lin

(57) ABSTRACT

There is provided a serial compressed bus interface having a reduced pin count. The interface includes a serial-to-parallel converter having a single serial data input line adapted to receive time-division multiplexed serial data from a plurality of data sources. Enable logic is adapted to input at least one data valid signal that identifies each of a plurality of data consumers for which the time-division multiplexed serial data is valid.

12 Claims, 3 Drawing Sheets

| CB_DV[2:0] | Application Buffer |
|---|---|
| 000 | No Data |
| 001 | Video1 |
| 010 | Video2 |
| 011 | Audio2 |
| 100 | Audio1 |
| 101 | Video3 |
| 110 | Video4 |
| 111 | Video5 |

FIG. 2

| CB_REQ[3:0] | Requesting Application |
|---|---|
| 0000 | No requests |
| xxx1 | Video1 |
| xx1x | Video2/PIP |
| x1xx | Audio1 |
| 1xxx | Audio2 |

FIG. 3

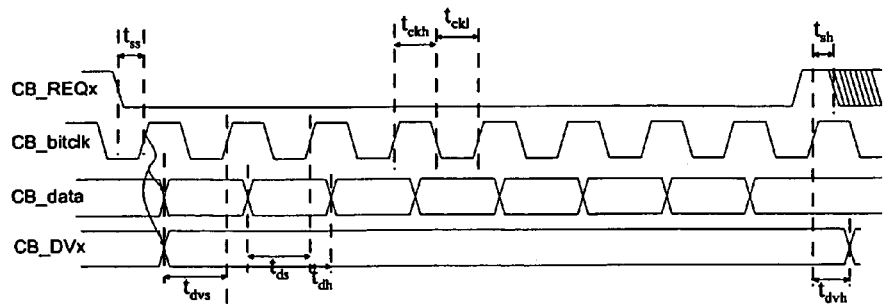

FIG. 4

| Parameter | Description | Min | Typ | Max | Units |
|---|---|---|---|---|---|
| $T_{ss}$ | Setup of CB_REQx before rising edge of CB_bitclk | | | | ns |
| $T_{sh}$ | Hold time of CB_REQx after rising edge of CB_bitclk | | | | ns |
| $T_{dvs}$ | Setup of CB_DVx before rising edge of CB_bitclk | | | | ns |
| $T_{dvh}$ | Hold time of CB_DVx after rising edge of CB_bitclk | | | | ns |
| $T_{ds}$ | Setup of CB_data before rising edge of CB_bitclk | | | | ns |
| $T_{dh}$ | Hold of CB_data after rising edge of CB_bitclk | | | | ns |
| $T_{ckh}$ | High time of CB_bitclk | 5 | | | ns |
| $T_{ckl}$ | Low time of CB_bitclk | 5 | | | ns |

FIG. 5

SERIAL COMPRESSED BUS INTERFACE HAVING A REDUCED PIN COUNT

TECHNICAL FIELD

The present invention relates generally to digital data communications and, in particular, to a serial compressed bus interface having a reduced pin count.

BACKGROUND DESCRIPTION

Conventional serial compressed data buses are dedicated to a single compressed data stream. Moreover, such buses require at least 3 to 4 pins. A typical 3 wire interface consists of a serial data signal, a clock signal and a sync or framing signal. The data is delivered in packets that are of a fixed size and the first bit of a packet is indicated by driving the sync or frame signal active.

An alternate 3 wire interface replaces the sync signal with a valid signal. The valid signal indicates when data is valid on the interface. As with the previous interface, this interface also requires packets to be of a fixed length. The first bit of a packet is indicated by driving the valid signal active. The valid signal is then required to remain active for the duration of a packet and is driven low at the end of the packet. When the valid signal is inactive, the data is ignored by the receiving device. Since the active edge of the valid signal is used to indicate the first bit of a packet, the valid signal must be driven inactive for at least one bit time between packets.

A widely accepted serial transport interfaces uses 4 wires to deliver data, clock, sync and valid signals. Like the 3 wire interface, the sync signal is driven active to indicate the first bit of a packet. Similarly, the valid signal is used to identify when data is valid on the interface. This approach gives the added flexibility that data gaps may exist within a packet time. Also, since the sync signal indicates the start of a new packet, there is no requirement for a gap between consecutive packets.

Given the current state of the art, there is a need for a serial compressed data bus that delivers more than one single compressed data stream. Moreover, there is a need for a serial compressed data bus interface having a reduced number of pins with respect to that required by conventional serial compressed data buses.

SUMMARY OF THE INVENTION

The problems state above, as well as other related problems of the prior art, are solved by the present invention, a serial compressed bus interface having a reduced pin count.

The invention advantageously reduces the pin count associated with conventional serial compressed buses by time-division multiplexing a plurality of compressed data streams onto a shared data line. Moreover, the invention advantageously encodes data valid and data request handshake signals rather than using a unique handshake signal pair for each compressed data stream as is done in conventional serial compressed buses.

These and other aspects, features and advantages of the present invention will become apparent from the following detailed description of preferred embodiments, which is to be read in connection with the accompanying drawings.

BRIEF DESCRIPTION OF THE DRAWINGS

FIG. 2 is a diagram illustrating the encoding of the CB_DV[2:0] signal, according to an illustrative embodiment of the invention;

FIG. 3 is a diagram illustrating the encoding of the CB_REQ[3:0] signals, according to an illustrative embodiment of the invention;

FIG. 4 is a timing diagram illustrating the timing relationship of some of the signals of the bus, according to an illustrative embodiment of the invention; and FIG. 5 is a diagram illustrating some of the timing parameters of some of the signals of the bus, according to an illustrative embodiment of the invention.

DETAILED DESCRIPTION OF PREFERRED EMBODIMENTS

Figure 1:
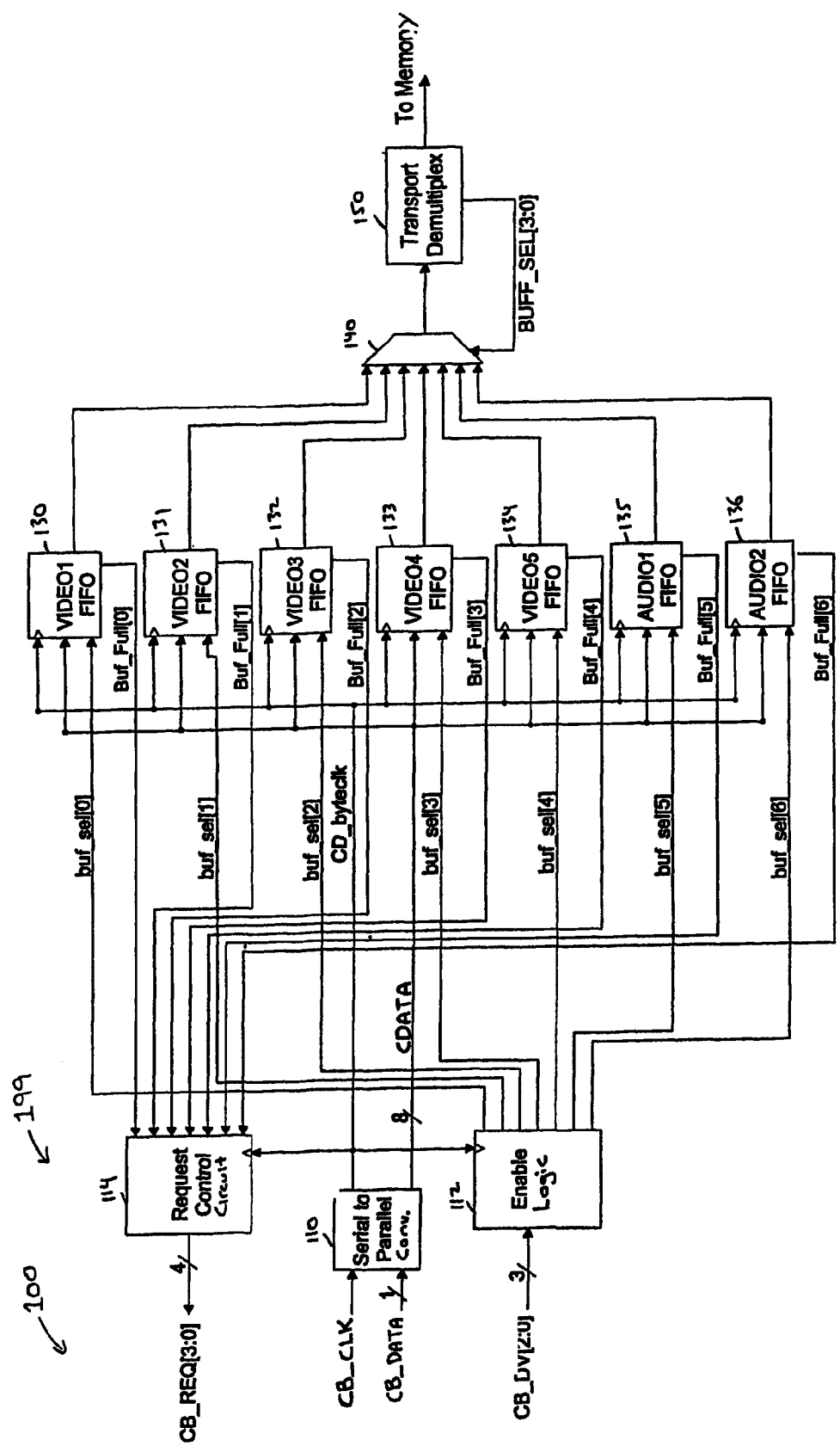
FIG. 1 is a block diagram of a serial compressed bus and serial compressed bus interface, according to an illustrative embodiment of the invention.

It is to be understood that the present invention may be implemented in various forms of hardware, software, firmware, special purpose processors, or a combination thereof. Preferably, the invention is implemented as a combination of hardware and software.

It is to be further understood that, because some of the constituent system components depicted in the accompanying Figures may be implemented in software, the actual connections between the system components may differ depending upon the manner in which the present invention is programmed. Given the teachings herein, one of ordinary skill in the related art will be able to contemplate these and similar implementations of the present invention.

FIG. 1 is a block diagram of a serial compressed bus 100 and a serial compressed bus interface 199, according to an illustrative embodiment of the invention. In the illustrative embodiment, serial data enters an integrated circuit through the bus 100. The bus 100 is implemented with a single serial data line that is time multiplexed between each of a plurality of data sources. Packet data from the different data sources is interleaved onto the single serial data line on byte boundaries. Each of the data sources is delivered to one or more data consumers in the receiving application device. As used herein, the term Aapplication@ refers to a consumer or processor of a compressed data stream, such as, for example, an MPEG2 video decoder or an AC-3 audio decoder.

To support decoding and presentation of multiple concurrent audio and video streams, the bus 100 will have support for up to seven separate application decoders. That is, the bus 100 can deliver seven compressed data streams corresponding to seven application decoders. It is to be appreciated that while the illustrative embodiment of FIG. 1 shows the use of seven compressed data streams the invention is not so limited and, thus, any feasible number of compressed data streams may be employed in accordance with the invention, while maintaining the spirit and scope thereof.

In the current state of the art, seven compressed data streams would be delivered over seven compressed data interfaces. Each of these interfaces would normally consist of at least three signals, requiring a total of 21 signals for seven compressed data streams. According to the invention, the bus 100 delivers the seven compressed data streams through nine external signals: CB_CLK; CB_DATA; CB_DV[2:0]; and CB_REQ[3:0]. The pin count of the bus 100 is reduced by a time-division multiplexing of the seven compressed data streams onto a shared data line. The pin count of the bus 100 is also lowered by encoding DV (data valid) and REQ (data request) handshake signals rather than using a unique handshake signal pair for each compressed data stream.

The bus 100 includes the following five inputs: CB_CLK; CB_DATA; and CB_DV[2:0]. The CB_CLK signal is the compressed bus serial clock, which supports a maximum speed of 100 MHz. The CB_DATA signal is the compressed bus serial data, which is valid on the rising edge of CB_CLK. The CB_DV[2:0] signals indicate that data on CB_DATA is valid for one of the seven supported application devices.

Each of the BUF_FULL[6:0] signals represents a compressed data buffer. It is to be appreciated that the phrase Acompressed data buffer@ and the term AFIFO@ (First-In-First-Out) are used interchangeably herein. When one of the BUF_FULL[6:0] signals is set to A1", it indicates that the corresponding compressed data buffer is full and cannot accept more data.

The bus 100 includes the following output: CB_REQ[3:0]. The CB_REQ[3:0] signals correspond to a request from at least one of the application devices.

Each of the BUF_SEL[6:0] signals represents an application device. When one of the BUF_SEL[6:0] signals is set to A1", it indicates that data will be removed from the application specific FIFO and sent to a common transport demultiplexing circuit 150.

A bus interface circuit 199 includes a serial-to-parallel converter 110, enable logic 112, and a request control circuit 114. The bus interface circuit 199 is coupled to a plurality of compressed data buffers 130-136 which, in turn, are coupled to main memory through a multiplexor 140 and transport de-multiplexor 150. Signals from the converter 110, enable logic 112, and the request control circuit 114 are used to write to the plurality of compressed data buffers 130-136.

The serial-to-parallel converter 110 converts serial data to parallel data. The serial data is time-division multiplexed and is input by the CB_DATA signal. The parallel data is 8-bits (1-byte) wide and is output by the CDATA signal. The CDATA signal is provided to the plurality of compressed data buffers 130-136.

The enable logic 112 selects a particular compressed data buffer to which data is to be written, based on the CB_DV[2:0] signal input thereto. Accordingly, the enable logic 112 outputs the BUF_SEL[6:0] signals.

The request control circuit 114 inputs the BUF_FULL[6:0] signals and outputs the CB_REQ[3:0] signals. Thus, the request control circuit 114 indicates when one or more of the compressed data buffers 130-136 is full and, thus, no additional data can be written thereto.

As noted above, the CB_DV[2:0] signals are used to indicate that valid data is present on CB_DATA for one of the seven application FIFOs 130-136. FIG. 2 is a diagram illustrating the encoding of the CB_DV[2:0] signal, according to an illustrative embodiment of the invention. The encoding has been chosen such that an external IC that supports three separate strobe signals to strobe data into the video decoder could be made to work with the bus 100 and still support two compressed video streams and one compressed audio stream. The CB_DV[2:0] signals will change state on the rising edge of the CB_CLK signal. The CB_DV[2:0] signals will hold a state for a minimum of eight CB_CLK cycles and a multiple of eight CB_CLK cycles. The data present on the CB_DATA signal can only be valid for one application FIFO at a time.

As noted above, the serial data for each application is converted into byte wide parallel format and transferred to the appropriate compressed data buffer. There is one FIFO (one of FIFOs 130 though 136) implemented for each application device. It is to be appreciated that the aggregate data rate received for all application devices should not exceed the sum total of the maximum data rate of all of the input channels.

The CB_REQ[3:0] signals are used to request compressed data for each of the application devices 130-136. When there is space available in an application=s FIFO, the corresponding CB_REQ line will be driven high. When there is no space available in an application=s FIFO, the corresponding CB_REQ line will be driven low. Several of the CB_REQ[ ] lines may be high at the same time.

In the illustrative embodiment of this invention, CB_REQ[3:0] can uniquely identify requests for data from as many as four unique application devices. In this embodiment it is to be understood that four of the application devices are grouped such that they share a single CB_REQ line. However, it is to be appreciated that the invention does not require any specific grouping of application devices or sharing of CB_REQ lines among application devices. Given the teachings of the invention provided herein, one of ordinary skill in the related art would readily contemplate a different grouping of application devices to share the available CB_REQ lines, or implementations of the invention that allow a request from each application device to be uniquely identified. FIG. 3 is a diagram illustrating the encoding of the CB_REQ[3:0] signals, according to the illustrative embodiment of the invention.

The CB_REQ[1] signal maps to the PIP/record channel video. It is possible within a system for multiple videos to be present on a single broadcast transponder. To allow the simultaneous decode of up to four videos present on a single transponder, the CB_REQ[1] signal is actually mapped to four separate compressed data buffers. When all of the compressed data buffers mapped to the CB_REQ[1] signal are ready to accept data, then the CB_REQ[1] signal is driven high. If any of the buffers mapped to the CB_REQ[1] signal are not ready to receive data, then the CB_REQ[1] signal is held low. If the data carried by the transponder is not multiplexed in a way that will allow simultaneous video decode of all videos present, then it is possible to underflow one or more of the bit buffers serviced by CB_REQ[1]. No provision will be made in this block to recover from this condition. However, given the teachings of the invention provided herein, one of ordinary skill in the related art will readily contemplate various modified configurations of the bus 100 which maintain the spirit and scope of the invention while allowing for recovery from underflow conditions. FIG. 4 is a timing diagram illustrating the timing relationship of some of the signals of the bus 100, according to an illustrative embodiment of the invention. FIG. 5 is a diagram illustrating some of the timing parameters of some of the signals of the bus 100, according to an illustrative embodiment of the invention.

Although the illustrative embodiments have been described herein with reference to the accompanying drawings, it is to be understood that the present system and method is not limited to those precise embodiments, and that various other changes and modifications may be affected therein by one skilled in the art without departing from the scope or spirit of the invention. All such changes and modifications are intended to be included within the scope of the invention as defined by the appended claims.

What is claimed is:

1. A serial compressed bus interface for interfacing with a bus having a single serial data line and at least one control line, comprising:

a serial-to-parallel converter having a data input coupled to said single serial data line and adapted to receive time-division multiplexed serial data from a plurality of data sources, said serial-to-parallel converter having a plurality of parallel output lines for providing thereon packets of said time-division multiplexed serial data in parallel form to a plurality of devices associated with data applications;

enable logic having an input coupled to said at least one control line for receiving a data valid signal that identifies which of said plurality of devices is associated with a particular packet of the time-division multiplexed serial data, said enable logic deriving a signal from said data valid signal to enable said identified device to receive said particular packet in parallel form, as provided by said serial-to-parallel converter; and a request control circuit adapted to output a request signal that requests said time-division multiplexed serial data for more than one but less than all of said plurality of devices.

2. The serial compressed bus interface according to claim 1, wherein said request signal requests said time-division multiplexed serial data from a single one of said plurality of data sources.

3. The serial compressed bus interface according to claim 2, wherein said single one of said plurality of data sources is a single broadcast transponder.

4. The serial compressed bus interface according to claim 1, wherein said plurality of devices comprises a plurality of data buffers.

5. The serial compressed bus interface according to claim 3, wherein said single broadcast transponder provides said requested time-division multiplexed serial data as a plurality of video channels.

6. The serial compressed bus interface according to claim 5, wherein said video channels are simultaneously decoded.

7. A method for transmitting serial compressed data from a plurality of data sources via a bus having a single data line and at least one control line to a plurality of devices associated with data applications, comprising the steps of:

time-division multiplexing the serial compressed data from the plurality of data sources to generate time-division multiplexed serial compressed data comprising packets onto said single data line;

providing to said at least one control line at least one data valid signal that identifies which of said plurality of devices is associated with a particular one of said packets;

converting said particular one of said packets to a packet of parallel data, and outputting said packet of parallel data for receipt by said identified device;

receiving from said at least one control line said at least one data valid signal;

deriving a signal from said at least one data valid signal to enable said identified device to receive said outputted packet of parallel data; and providing a request signal that requests said time-division multiplexed serial compressed data for more than one but less than all of said plurality of devices.

8. The method according to claim 7, wherein said request signal request said time-division multiplexed serial compressed data from a single one of said plurality of data sources.

9. The method according to claim 8, wherein said single one of said plurality of data sources is a single broadcast transponder.

10. The method according to claim 7, wherein said plurality of devices comprises a plurality of data buffers.

11. The method according to claim 9, wherein said single broadcast transponder provides said requested time-division multiplexed serial compressed data as a plurality of video channels.

12. The method according to claim 11, wherein said video channels are simultaneously decoded.

* * * * *